UNITED STATES PATENT OFFICE.

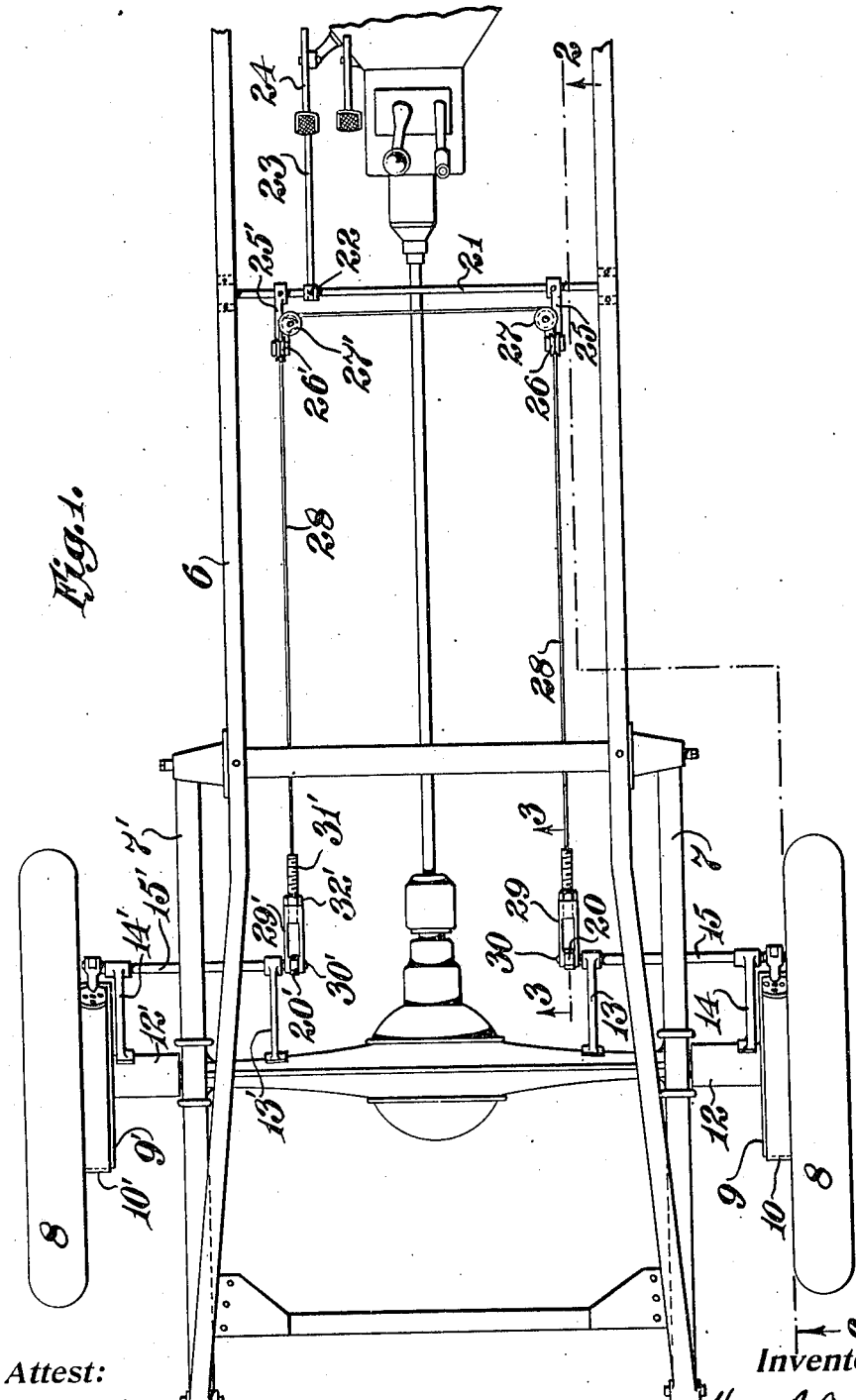

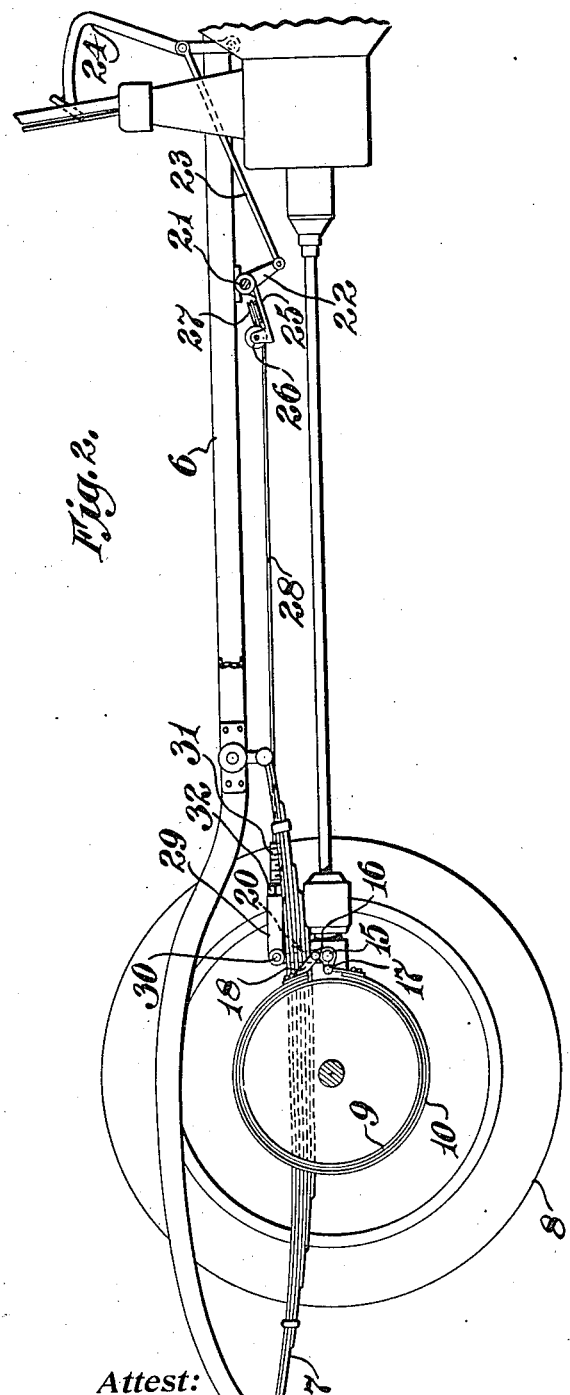
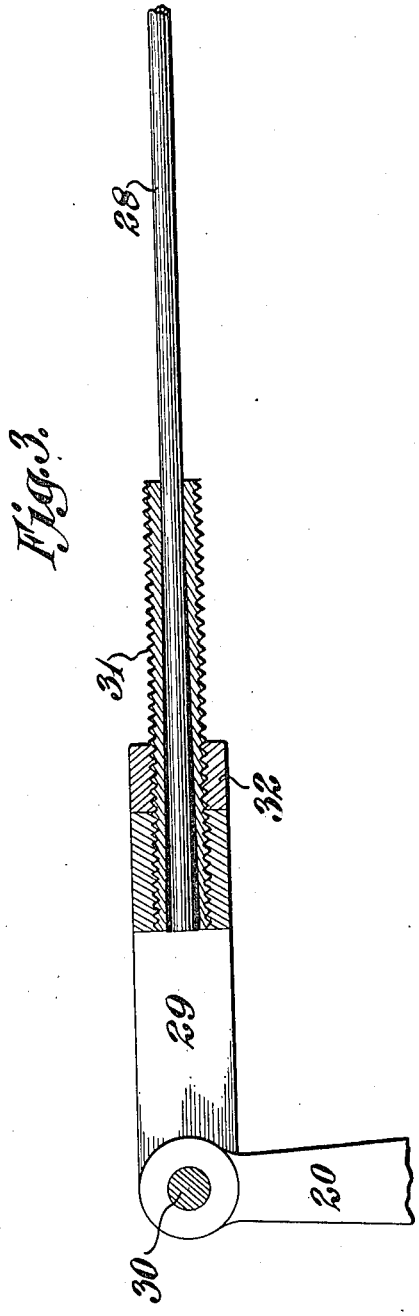

HENRY P. ARNDT, OF AMSTON, CONNECTICUT, ASSIGNOR OF TWO-THIRDS TO CHARLES M. AMS, OF NEW YORK, N. Y.

SELF-EQUALIZING BRAKE SYSTEM.

1,261,675.  Specification of Letters Patent.  Patented Apr. 2, 1918.

Application filed September 20, 1916. Serial No. 121,306.

*To all whom it may concern:*

Be it known that I, HENRY P. ARNDT, a citizen of the United States, and a resident of Amston, county of Tolland, and State of Connecticut, have invented certain new and useful Improvements in Self-Equalizing Brake Systems, of which the following is a specification.

This invention relates to brake control mechanisms for vehicles, with more particular reference to self-propelled vehicles. The usual braking device for an automobile comprises the common and well-known drum and brake-band at each end of the rear axle of the car, controlled through the medium of connecting rods operated in a well-known manner through the instrumentality of either the usual foot-pedal or the locking "emergency" lever, both conveniently located with respect to the seat of the chauffeur or driver.

There is probably no question about the efficiency of this present braking system in all respects except alone that of the insured equalization of the applied braking forces on both sides of the machine. When these forces are unequal, the action of the entire braking system may be said to have much the same effect as that produced by the rudder of a boat, the more intense forces applied on one side of the machine tending to create a torsional distortion of the axle and creating forces which have the effect of turning the car to a greater or lesser extent, depending upon the degree of variation in the applied braking forces on each side of the machine, thus causing the objectionable and dangerous "skidding" of the car.

The principal object of the present invention is the provision of what may be termed a self-equalizing braking system—that is to say, one in which the braking forces on both sides of the machine are automatically equalized under any and all ordinary conditions.

My invention will be more readily understood by reference to the accompanying drawings, forming a part of this specification, in which:

Figure 1 is a top plan view of the major portion of the chassis of an automobile, with a practical and convenient embodiment of my invention applied thereto;

Fig. 2 is a vertical section, taken substantially on the broken line 2—2 of Fig. 1, and Fig. 3 is a detail in enlarged partial central sectional elevation, hereinafter more fully described.

Referring now to the drawings in detail, numeral 6 designates the frame of the chassis of an automobile carrying the usual springs 7 7' which are supported upon the rear axle of the car through the medium of the usual journal boxes, this axle carrying the rear wheels 8 8' adjacent to which are the brake-drums 9 9'. To this extent the drawings illustrate a common and well-known construction and arrangement, and for this reason neither this construction nor the power applying means need be further described in detail.

Encircling the drums 9 9' are the usual brake-bands 10 10', and it is to be understood that one or the other of these co-acting parts may be provided with any one of various kinds of material having a high degree of frictional resistance—this being a common and well-known expedient.

Mounted upon the rear axle casing 11 and the journal box 12, respectively, are the arms 13 and 14, in the ends of which is journaled the rock-shaft 15. I have shown the outer end of this rock-shaft 15 provided with what may be termed a bell-crank lever comprising the arms 16 and 17. To the arm 16 is pivoted the connecting-rod or link 18, the other end of which is secured to one end of the brake-band, while to the arm 17 is pivoted the link 19 secured at its other end to the other end of the brake-band 8. From an inspection of Fig. 2, it will be seen that when the shaft 15 is turned in clock-wise direction, the arms 16 and 17 will operate to reduce the diameter of the circle of the brake-band 8, thereby clamping the same against the drum 7 and braking the rear axle of the vehicle in a common and well-known manner. In fact, no patentable novelty is claimed for this band-tightening mechanism, as just described.

At the other end of the rock-shaft 15 is mounted the arm 20, and it is to be understood that the rock-shaft 15', on the other side of the machine, is similarly mounted and provided with corresponding band-tightening arms, and also carries the arm 20' correspondingly positioned with respect to the arm 20 on the shaft 15.

Suitably journaled in the chassis frame near the forward end thereof is the rock-shaft 21, carrying the arm 22 to the end of which is pivoted one end of the connecting-rod 23, the other end of which is pivoted to the foot-actuating brake-lever 24 in the usual manner, whereby said shaft 21 may be rocked upon oscillation of said lever. The rock-shaft 21 is also provided with the correspondingly positioned fixed arms 25 25'. At the end of these arms is mounted the vertically disposed pulleys 26 and 26', respectively, between which and the other ends of said arms are mounted the transversely disposed pulleys 27 27'. Secured to the free end of the arm 20, in any desired manner, but preferably as shown and hereinafter described, is one end of the wire or cable 28, this wire or cable passing under the pulley 26 and around the pulley 27 on the arm 25, thence around the pulley 27' and under the pulley 26' on the arm 25', and thence to the arm 20' on the rock-shaft 15', to the end of which it is secured in any desired manner, or preferably as hereinafter described.

It will be apparent that with the wire or cable 28 under slight normal tension, the forces transmitted thereby through the rock-shafts 15 and 15' to the respective brake bands, upon operation of the rock shaft 25, will be equal under any and all conditions, the equalizing mechanism being entirely automatic, thus eliminating the necessity for the exercise of great care in the adjustment of the connections of separate brake-rods and insuring absolutely uniform braking forces on both sides of the machine.

I have referred to a preferred manner of securing the ends of the wire or cable 28 to the respective arms 20 and 20' on the rock shafts 15 and 15'. My preferred construction, is shown in Figs. 1 and 2, and in enlarged detail in Fig. 3. It comprises a clevis or substantially U-shaped member 29, the legs of which are pivotally connected with the arm 20 by means of a pin or bolt 30, while the base of member 29 is provided with a threaded hole in which is screwed a threaded tube 31, upon which is placed a threaded spacing and locking nut 32. The hole in tube 31 is preferably tapered, as shown in Fig. 3, and in this hole the end of cable 28 is secured by expanding or soldering, or in any other preferred manner.

It will be apparent that the means just described for securing the ends of the cable 28 to arms 20 and 20' serve somewhat the same purpose as a turnbuckle. When it is desired to tighten the cable 28, the nut 32 is turned until it is moved a sufficient distance away from the member 29, the tube 31 is screwed farther into member 29 until the desired tension is imposed upon the cable 28, and the nut 32 is then screwed tigthly into place against turning in its seat in the base of the member 29. Efficient provision is thus made for taking up stretch in the cable 28 easily and quickly, as well as for imparting the desired initial tension to said cable.

Many modifications of minor details of my improved brake equalizing mechanism for vehicles will doubtless readily suggest themselves to those skilled in the art to which it appertains, and I therefore do not desire to limit my invention to the specific construction herein shown and described.

I claim as new and desire to secure by Letters Patent:

1. In a brake mechanism for vehicles, the combination, with a pair of vehicle wheels and a friction brake associated with each thereof, of a flexible cable or the like, brake-actuating devices interposed between the ends of said cable and said brakes, respectively, a rock-shaft having a fixed cable-tensioning arm at each end thereof, said arms carrying sheaves around which said cable is passed, a sheave being located substantially at the end of each arm and another being located intermediate the ends of each arm, whereby the cable section between said arms is relatively located intermediate the ends of said arms, and manually operated means for rocking said shaft.

2. In a brake mechanism for vehicles, the combination, with a pair of vehicle wheels and a friction brake associated with each thereof, of a flexible cable or the like, brake-actuating devices interposed between the ends of said cable and said brakes, respectively, a rock-shaft having a fixed cable-tensioning arm at each end thereof, each of said arms carrying a substantially vertically disposed sheave at the end thereof and a transversely disposed sheave intermediate the ends thereof around which sheaves said cable is passed, whereby the cable section between said arms is relatively located intermediate the ends of said arms, and means for rocking said shaft.

In testimony of the foregoing, I have hereunto set my hand in the presence of two witnesses.

HENRY P. ARNDT.

Witnesses:
EDLA MOTT,
CHESTER F. HAYDEN.

Copies of this patent may be obtained for five cents each, by addressing the "Commissioner of Patents, Washington D. C."